United States Patent
Hendrix et al.

(10) Patent No.: US 10,988,311 B2
(45) Date of Patent: Apr. 27, 2021

(54) DEVICE AND METHOD FOR HANDLING STORAGE UNITS

(71) Applicant: Robert Bosch GmbH, Stuttgart (DE)

(72) Inventors: Gottfried Hendrix, Gemuenden (DE); Peter Rehbein, Erlabrunn (DE); Christian Knoll, Stuttgart (DE); Jens Hofele, Lenningen (DE); Stefan Junker, Nuremberg (DE); Thorsten Smetak, Sennfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/572,883

(22) Filed: Sep. 17, 2019

(65) Prior Publication Data
US 2020/0087064 A1 Mar. 19, 2020

(30) Foreign Application Priority Data
Sep. 18, 2018 (DE) .................. 10 2018 215 780.4

(51) Int. Cl.
*B65G 1/04* (2006.01)
*B66F 9/02* (2006.01)

(52) U.S. Cl.
CPC .......... *B65G 1/0421* (2013.01); *B65G 1/0428* (2013.01); *B65G 1/0471* (2013.01); *B66F 9/02* (2013.01)

(58) Field of Classification Search
CPC ... B65G 1/0421; B65G 1/0428; B65G 1/0471
See application file for complete search history.

(56) References Cited

U.S. PATENT DOCUMENTS

| | | | | |
|---|---|---|---|---|
| 4,139,107 A | * | 2/1979 | Ninomiya | B66C 13/46 414/392 |
| 4,778,325 A | * | 10/1988 | Stolzer | B66F 9/07 414/276 |
| 5,147,176 A | * | 9/1992 | Stolzer | B65G 1/0442 198/346.1 |
| 5,156,514 A | * | 10/1992 | Zah | B65G 1/1378 414/278 |

(Continued)

FOREIGN PATENT DOCUMENTS

| | | | | |
|---|---|---|---|---|
| CA | 2725951 A1 | * | 12/2009 | ........... B65G 1/0471 |
| DE | 102009017241 A1 | * | 10/2010 | ........... B65G 1/0471 |

(Continued)

*Primary Examiner* — Kaitlin S Joerger
(74) *Attorney, Agent, or Firm* — Maginot, Moore & Beck LLP

(57) ABSTRACT

A device for automatically handling storage units includes a support frame, at least one lifting unit, a gripper device configured to grip, convey, and discharge at least one storage unit, and at least one height adjustment device to which the gripper device is connected and is configured to be moved in the inner space of the support frame therewith. A storage arrangement which is configured to be charged from below for at least one storage unit is arranged above the gripper device so that the same support frame is configured by the lifting unit to convey and to store, by the storage arrangement, at least one storage unit. A method includes automatic handling of storage units via the device.

17 Claims, 6 Drawing Sheets

(56) References Cited

U.S. PATENT DOCUMENTS

| | | | | |
|---|---|---|---|---|
| 5,915,909 | A * | 6/1999 | Smith | B65G 1/0435 |
| | | | | 187/360 |
| 6,409,451 | B1 * | 6/2002 | Fallin | B65G 1/0421 |
| | | | | 198/433 |
| 9,272,845 | B2 * | 3/2016 | Honkanen | B65G 1/0464 |
| 10,300,610 | B1 * | 5/2019 | La Rovere | B25J 15/0293 |
| 10,370,224 | B2 * | 8/2019 | Miyoshi | B65G 63/002 |
| 10,464,786 | B2 * | 11/2019 | Miyoshi | B65G 63/002 |
| 10,479,602 | B2 * | 11/2019 | Cifelli | B65G 1/04 |
| 2019/0070733 | A1 * | 3/2019 | Barth | B25J 9/1697 |

FOREIGN PATENT DOCUMENTS

| | | | | |
|---|---|---|---|---|
| EP | 2982624 B1 * | 10/2017 | | B65G 1/14 |
| WO | WO-2009147868 A1 * | 12/2009 | | E04H 6/24 |
| WO | WO-2016020397 A1 * | 2/2016 | | B65G 1/14 |

\* cited by examiner

DEVICE AND METHOD FOR HANDLING STORAGE UNITS

This application claims priority under 35 U.S.C. § 119 to patent application no. DE 10 2018 215 780.4, filed on Sep. 18, 2018 in Germany, the disclosure of which is incorporated herein by reference in its entirety.

BACKGROUND

The present disclosure relates to a device for automatically handling storage units and an operating method which is suitable therefor. The device in one embodiment is used in particular as a handling robot for standardized material cases, so-called KLT (small load carriers).

With advances in automation technology, the handling of small load carriers is taking on increasing significance. There is known a stacking/operating vehicle for charging and removing storage units, in which a first carrier device for placing at least one storage unit is connected to a first height adjustment device and a second carrier device for placing at least one storage unit is connected to a second height adjustment device and each one can be moved in the vertical direction. To this end, the storage units are movable relative to each other in the vertical direction. The carrier devices have extensible gripper devices. At least one storage unit is lifted upward by the first carrier device from a stack of storage units, for example, containers, having four side walls and a base plate which is arranged sideways outside the stacking/operating vehicle, the storage unit below—which is now the uppermost one—is removed by the second carrier device in a horizontal direction and subsequently the lifted-off storage unit is deposited by the first carrier device downward on the remaining stack. A storage action of a floor storage of storage units located outside the stacking/operating vehicle is thereby carried out.

Space cannot be saved in this arrangement. In particular, the base face of the processed storage stack is located outside the stacking/operating vehicle. Furthermore, the storage unit which is drawn off into the stacking/operating vehicle and the second transport device spatially impair additional storage actions within the stacking/operating vehicle.

SUMMARY

On this basis, an object of the present disclosure is to provide a device and a method which reduce or even prevent the disadvantages mentioned. In particular, the carrying out of storage actions is intended to be improved in a structurally simple and space-saving manner. Furthermore, the method is intended to automatically allow flexible and time-saving storage actions.

These objects are achieved with a device and a method according to the disclosure. Additional embodiments of the disclosure are set out in the patent claims which are formulated in a dependent manner. It should be noted that the description, in particular in connection with the drawings, sets out additional details and developments of the disclosure which can be combined with the features from the patent claims.

A device for automatically handling storage units (LE) contributes thereto, at least having:
a support frame,
at least one lifting unit and a gripper device which is arranged thereon for gripping, conveying and discharging at least one storage unit,
at least one height adjustment device, to which the gripper device is connected and can be moved in the inner space of the support frame therewith.

Furthermore, a storage arrangement which can be charged from below for at least one storage unit is arranged above the gripper device so that the same support frame is configured by the lifting unit to convey and to store, by the storage arrangement, at least one storage unit.

In this case, the storage units (LE) are in particular cases, KLTs or similar transport boxes which can preferably be stacked. The support frame may be a frame which is constructed from bars, pipes or profile-members, wherein openings can also be formed. The base face and at least individual side faces may be closed.

The device set out herein may be constructed in a modular manner, wherein at least one conveyor module and one storage module are provided for at least one storage unit. A receiving module for at least one storage unit is also preferably provided. The receiving module is advantageously constructed as a receiving space having a receiving face and may be arranged at the lower end of the support frame.

The conveyor module comprises at least one lifting and lowering unit, on which a gripper device is arranged. The lifting unit conveys at least one storage unit upward and downward in a vertical direction within the support frame. The gripper device is capable of gripping and releasing at least one storage unit in a horizontal direction. The lifting unit having the gripper device is movable between the receiving face and a storage arrangement which is present, for example, at the upper end of the support frame. The storage arrangement is charged by the at least one gripper device from below with at least one storage unit. This can mean in other words that the storage arrangement has a base region or receiving region which can be (spatially) expanded at predetermined times so that the storage unit can be received at least partially from below in the storage arrangement. With the measures set out, at least one storage unit can be received, conveyed and stored by the same support frame.

The height adjustment device to which the gripper device is connected can be fitted to or integrated in the support frame. The gripper device is vertically adjustable by means of the height adjustment device.

In that the proposed device comprises integral modules, it is possible in a particularly effective manner for the storage actions to be carried out in a structurally simple and space-saving manner within the device. In the inner space of the support frame, the receiving, conveying and storage of at least one storage unit are enabled. A particular advantage involves the storage arrangement above the conveyor module (work space) being used to store the necessary goods for the transport, storage or work stations, at which the device is used. There is provided an integrated additional storage space for full and empty storage units at the upper end of the device for automatically handling storage units.

A frame and at least one gripper unit which can grip the cases from the side are made available with the device set out herein. Transport vehicles or pallets with the KLT can be positioned from the rear in a receiving face of the automatic device for handling (the robot). In this case, the receiving face is located within the floor face of the device. The device can receive cases from the carriage, where applicable divide a stack and temporarily store the upper portion in a storage unit. The desired case can be discharged forward onto a roller belt.

Advantageously, the storage arrangement is arranged in a fixed manner on the support frame and has a retention device for receiving and discharging for at least one storage unit. In particular, the retention device is not configured to displace or to convey the at least one storage unit spatially. The term "fixed" is intended to be understood to mean in particular the non-displaceable or rigid arrangement/assembly on the support frame, in particular at the upper end within the support frame.

Preferably, the support frame has at least one opening for conveying and conveying away or transport and transport away of at least one storage unit, wherein at least one conveyor device or at least one transport device for at least one storage unit is connected to the at least one opening. The conveyor device may be a roller table, a belt conveyor or the like. The transport device may be a floor roller, an AGV (Automated Guided Vehicle or driverless transport vehicle) or the like.

Preferably, the height adjustment device is a vertical guiding device (linear guide). It may also be advantageous for the height adjustment device to be a scissor type lifting and lowering device.

Advantageously, the gripper device is capable of gripping and releasing the at least one storage unit in a horizontal direction, wherein the gripper device is movable in a horizontal, lateral manner. The complete gripper arrangement can as a whole also be moved in a horizontal, lateral manner in order to compensate, for example, for a position error of a carriage or in order, where applicable, to receive cases which are stacked at an angle and to be able to deposit them again correctly.

Preferably, the storage arrangement is integrated in the support frame. This may mean that it does not project beyond the dimensions of the support frame and/or that the dimensions and operating mode of the support frame are configured in such a manner that the storage arrangement can be reached by the lifting unit via the height adjustment device without leaving the inner space of the support frame.

The retention device preferably comprises a clamping device for at least one storage unit. Such a clamping device can be provided with a plurality of claws, sliders, actuators, etc., which can change relative to a reference face over a spacing where applicable or temporarily. The clamping device may where applicable configure a positive-locking and/or non-positive-locking connection with the storage unit, particularly without a simultaneous displacement of the storage unit, the lifting unit and/or the height adjustment device.

Advantageously, a storage detection device for at least one storage unit having at least one sensor arrangement is associated with the gripper device. The sensor arrangement is provided to identify the position of the cases.

Advantageously, the gripper device can be charged from below and/or above.

Additional details of the device will also be appreciated from the following explanation regarding the operating method. In particular, the explanations relating to the method can be used here in a supplementary manner. It is also the case that the above explanations relating to the device can supplement the description of the method.

There is further proposed here a method for carrying out storage actions with at least one storage unit (LE) by means of a device for automatically handling storage units with at least one lifting unit having a gripper device. The method may be carried out in particular with the device which is also set out herein.

The method comprises at least the following steps:
a) detecting the at least one storage unit with the gripper device;
b) moving the gripper device with the at least one storage unit in a vertical direction upward into a storage arrangement,
c) retaining the at least one storage unit in the storage arrangement;
d) releasing the at least one storage unit from the gripper device.

The steps a) to d) are preferably carried out in the sequence given, wherein the steps can equally well be superimposed at least partially in terms of time and/or repeated separately.

Advantageously, the method comprises the additional steps of:
e) positioning at least one storage unit in the inner space of a support frame;
f) moving the gripper device in a vertical direction downward as far as the at least one storage unit.

The retention device preferably clamps the at least one storage unit laterally.

Preferably, the gripper device removes at least one storage unit from the storage arrangement and discharges it onto a conveyor device or transport device.

Preferably, the gripper device receives at least one storage unit from the conveyor device or transport device. In particular, the storage unit is received in a receiving space of the device.

The explanations relating to the device apply accordingly to the method proposed herein, and vice versa.

The device and/or method which are set out here for automatically handling storage units afford in particular the following advantages:
  there is proposed a case handling robot for loading and unloading cases/KLTs of extremely different types with an integrated additional storage space, in which full and empty cases/KLTs can be temporarily stored at the upper end of the case handling robot,
  it provides an automatic identification system for cases/KLTs for positioning the gripper of the case handling robot,
  the system is scalable for different numbers of cases/KLTs on a floor roller/pallet,
  it requires only a small amount of space because the storage space is arranged above the handling space,
  it enables a flexible loading and unloading of the floor roller/the pallet,
  a return of the cases/KLTs via a second roller belt is possible,
  the system is scalable for different roller belt heights,
  all the cases/KLTs can be lifted off the floor roller/pallet into the store and then further onto the roller belt. Simultaneous loading of the floor roller/pallet by the return roller belt is also possible,
  in an expanded version, the case handling robot is movable and can be transported by an AGV to different work places,
  it is possible to decouple the case lifting function and the case transport function for optimum use. The case handling robot can provide cases/KLTs on a roller belt while AGV provides new cases/KLTs or brings back, for example, empty ones,
  automatic communication between the case handling robot and AGVs is possible,
  by electronically detecting the temporarily stored cases/KLTs at the respective station, the need for new cases KLTs can be accurately planned and also controlled (for example, during shift changes, breaks, etc.).

BRIEF DESCRIPTION OF THE DRAWINGS

The disclosure and the technical environment are explained in greater detail below with reference to the drawings. In this case, the same components are indicated with the same reference numerals. The illustrations are schematic and are not provided for depicting size relationships. The explanations which are set out with regard to individual details of a figure can be extracted and freely combined with technical matters from other figures or the present description, unless something else necessarily results for a person skilled in the art or such a combination is explicitly forbidden. In the drawings.

DETAILED DESCRIPTION

Figure 1:
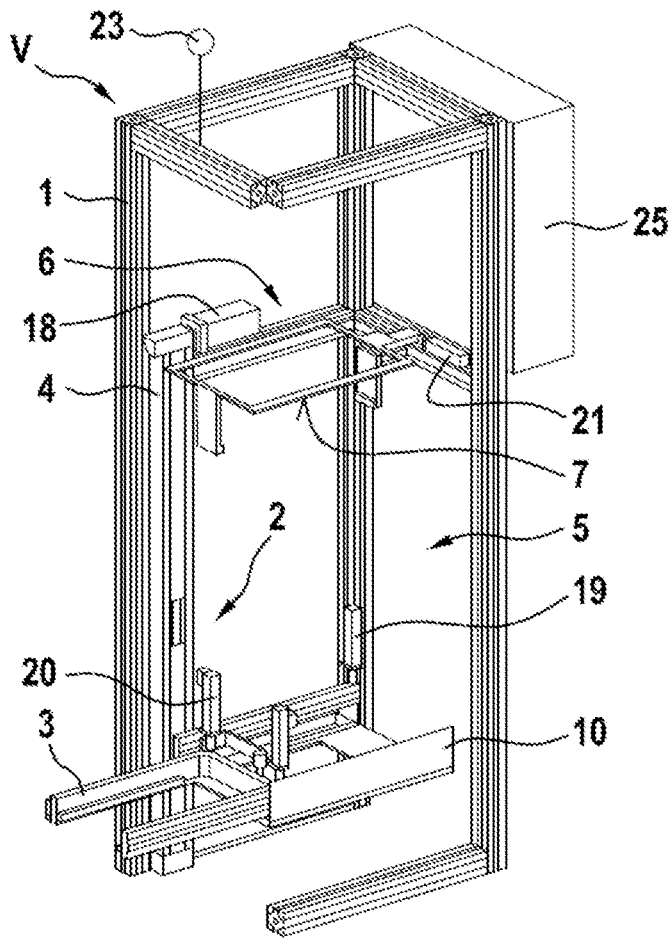
FIG. 1: is a perspective illustration of the device according to the disclosure with a support frame (which is illustrated in a broken-away manner), a lifting unit with a gripper device and a storage arrangement with a retention device.

FIG. 1 is a schematic illustration of the device V which is set out here for automatically handling storage units LE. In this case, a parallelepipedal support frame 1 which comprises mutually connected profile rods and which surrounds an inner space 5 is provided. A lifting unit 2 and a gripper device 3 which is connected thereto are arranged in the inner space 5 and are used to detect, convey and discharge at least one storage unit LE (see FIG. 2). The lifting unit 2 comprises a carrier unit 10 for the gripper device 3. Furthermore, a height adjustment device 4 is further provided in the form of a vertical guiding device, to which the gripper device 3 is connected and can be moved by means of the height adjustment device 4 in the inner space 5 vertically upward and downward. Furthermore, a storage arrangement 6 which is charged from below for at least one storage unit LE is provided above the gripper device 3 in the inner space 5. The storage arrangement 6 is fitted to the support frame 1 and has a retention device 7 for receiving and discharging the at least one storage unit. A first motor is designated 18 as a motor vertical axis (both sides), a second motor is designated 19 as a motor horizontal axis, a third motor is designated 20 as a motor gripper axis (both sides) and a fourth motor is designated 21 as a motor retention axis and storage retention axis. The motors 18, 19, 20 and 21 function reversibly. A switch cabinet is designated 25.

Figure 1A:
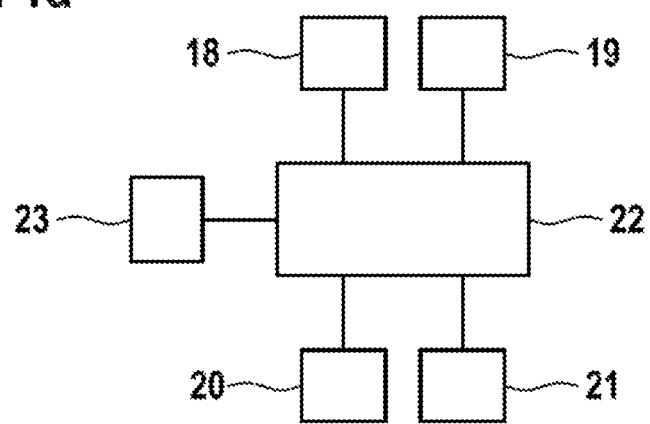
FIG. 1a: is a flow chart with a control device, to which four motors and one sensor arrangement are connected.

A sensor device, for example, a camera, is designated 23 and is connected to an electronic control device 22 according to FIG. 1a together with the motors 18, 19, 20 and 21.

Figure 2:
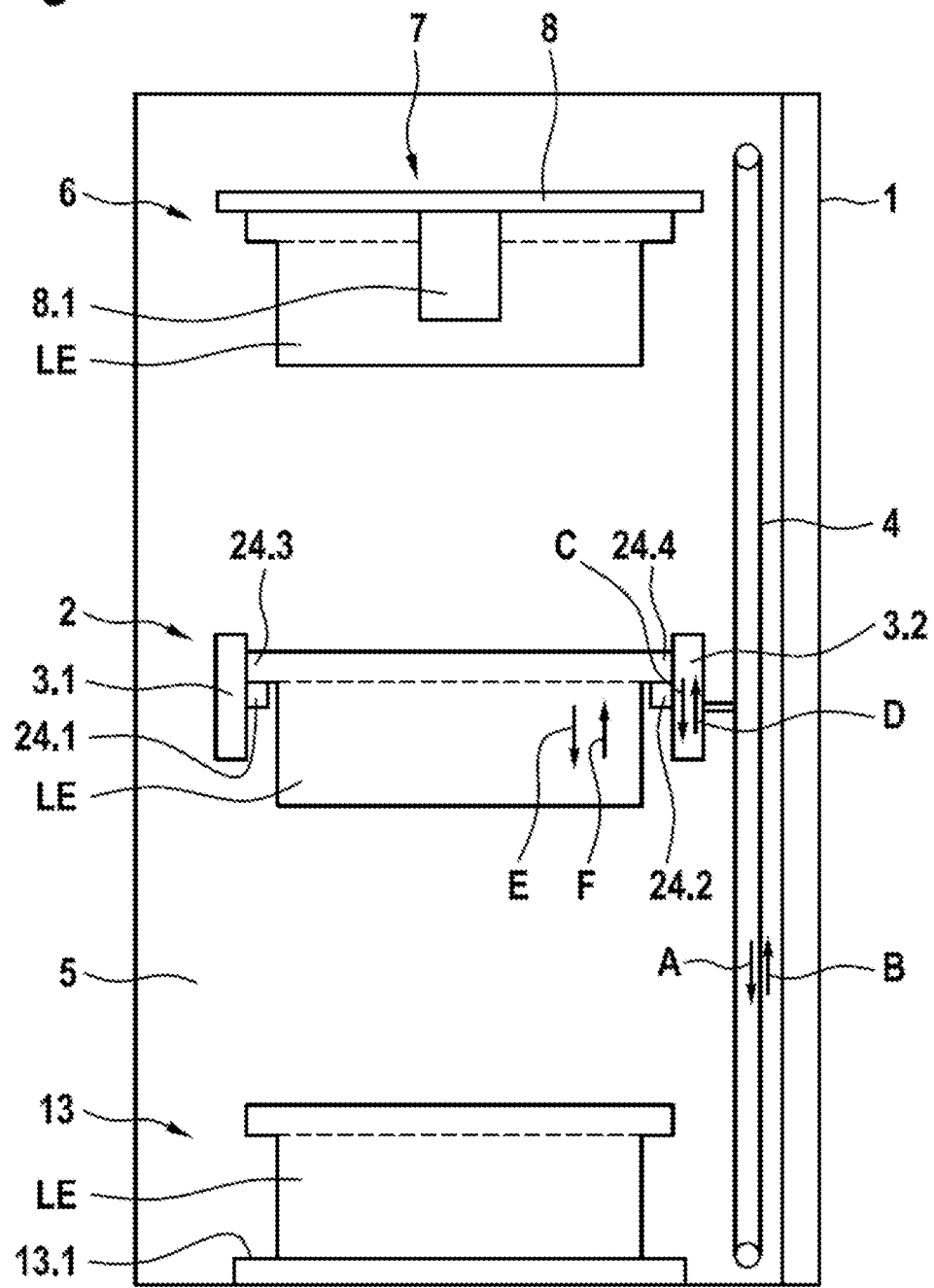
FIG. 2: is a front view of the device according to FIG. 1 with three storage units in three different positions and with a height adjustment device and receiving face.

FIG. 2 is a schematic front view of the device V (according to FIG. 1) with three storage units LE which are arranged one above the other in three positions. Three modules can be seen: at the lower end of the inner space 5, there is located a receiving space 13 with a receiving face 13.1 for a storage unit LE. At the center of the inner space 15, the gripper device 3—which is fitted to the lifting unit 2 (see FIG. 1)—is shown and has detected and retains a storage unit LE in a positive-locking manner. At the upper end of the inner space 5, the storage arrangement 6 with a retention device 7 is provided. The retention device 7 comprises a retention frame 8 and two clamping elements 8.1 and 8.2 (see FIG. 3) which have detected and retains a storage unit. In the inner space 5, the height adjustment device 4 is present as a component of the lifting device 2. The travel path of the vertical axis of the height adjustment device 4 is indicated with the arrows A (down) and B (up). The gripper device 3 which is connected to the height adjustment device 4 is thereby moved in the direction of the arrows C and D. The lifting unit 2 particularly comprises the height adjustment device 4 and the first motor 18 (see FIG. 1). The height adjustment device 4 can be constructed as a mechanical or electromagnetic linear guide or as a scissor type mechanism (see FIG. 5).

The first gripper element 3.1 and the second gripper element 3.2 have a first attachment 24.1 and a second attachment 24.2 which face each other. The storage unit LE has in the upper region at two mutually opposite side walls a third attachment 24.3 and a fourth attachment 24.4 which face away from each other. The first attachment 24.1 engages under the third attachment 24.3 and the second attachment 24.2 engages under the fourth attachment 24.4, whereby a positive-locking engagement is produced. It is also possible for the first gripper element 3.1 and the second gripper element 3.2 to detect the opposite side walls of the bearing unit LE in a clamping manner, whereby a non-positive-locking engagement is brought about.

Figure 3:
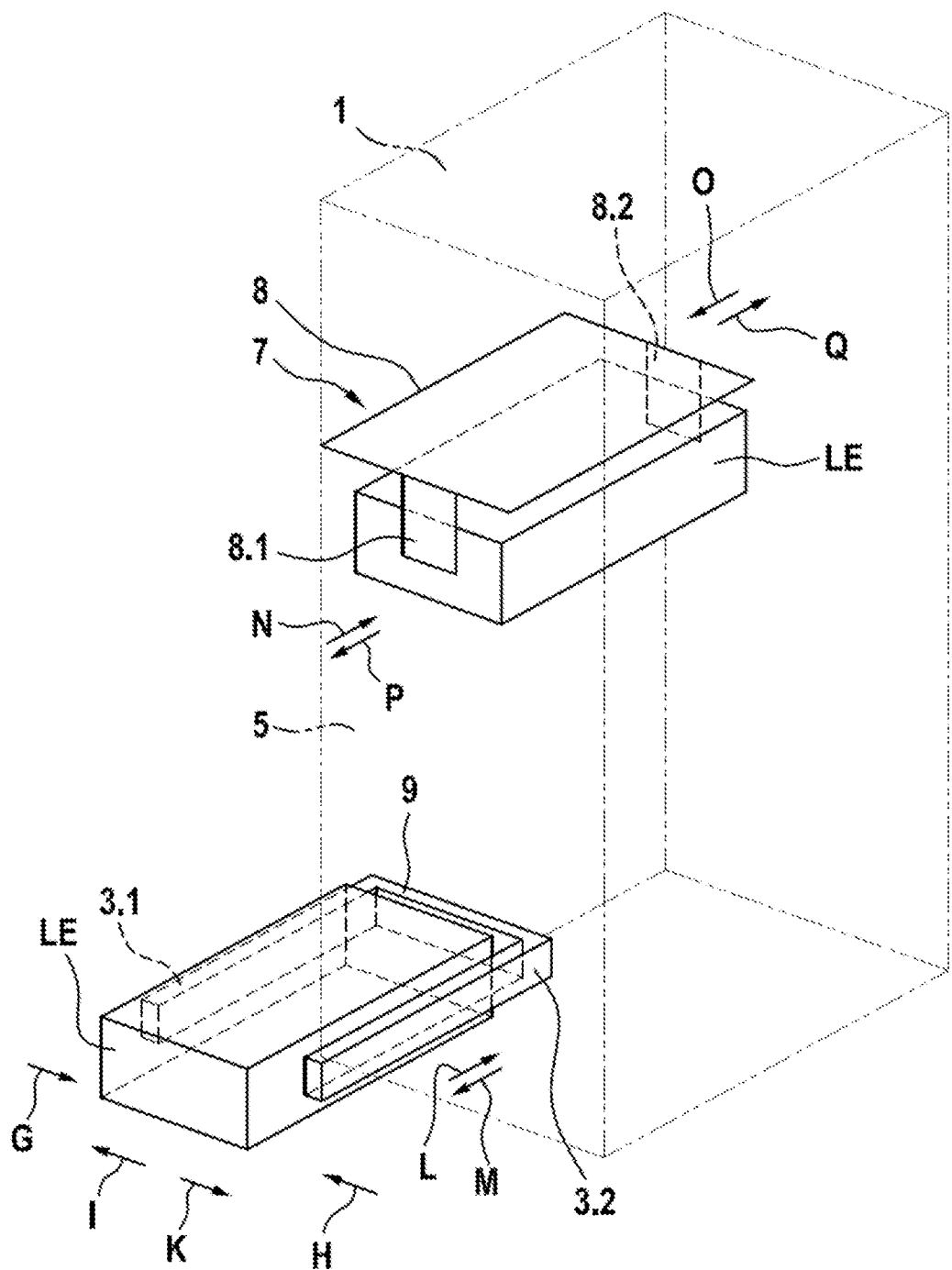
FIG. 3: shows the device according to FIG. 1 with movement directions of the gripper device and the retention device being indicated.

FIG. 3 illustrates the device V according to FIG. 1 with movement directions of the gripper device 3 and the retention device 7 being indicated. The gripper device 3 comprises a first gripper element 3.1 and a second gripper element 3.2 which can be moved for gripping in the direction of the arrows G and H and for opening in the direction of the arrows I and K. The gripper device 3 (loading gripper) can be extended in the direction of the arrow M—in relation to the inner space 5—and can be retracted in the direction of the arrow L. The retention device 7 of the storage arrangement 6 has a retention frame 8, to which a first retention element 8.1 and a second retention element 8.2 which can be moved for clamping in the direction of the arrows N and O and for opening in the direction of the arrows P and Q are fitted. The movement directions of the gripper elements 3.1, 3.2 and the retention elements 8.1, 8.2 are orientated perpendicularly to each other. A transverse carrier for the gripper elements 3.1 and 3.2 is designated 9.

Figure 4:
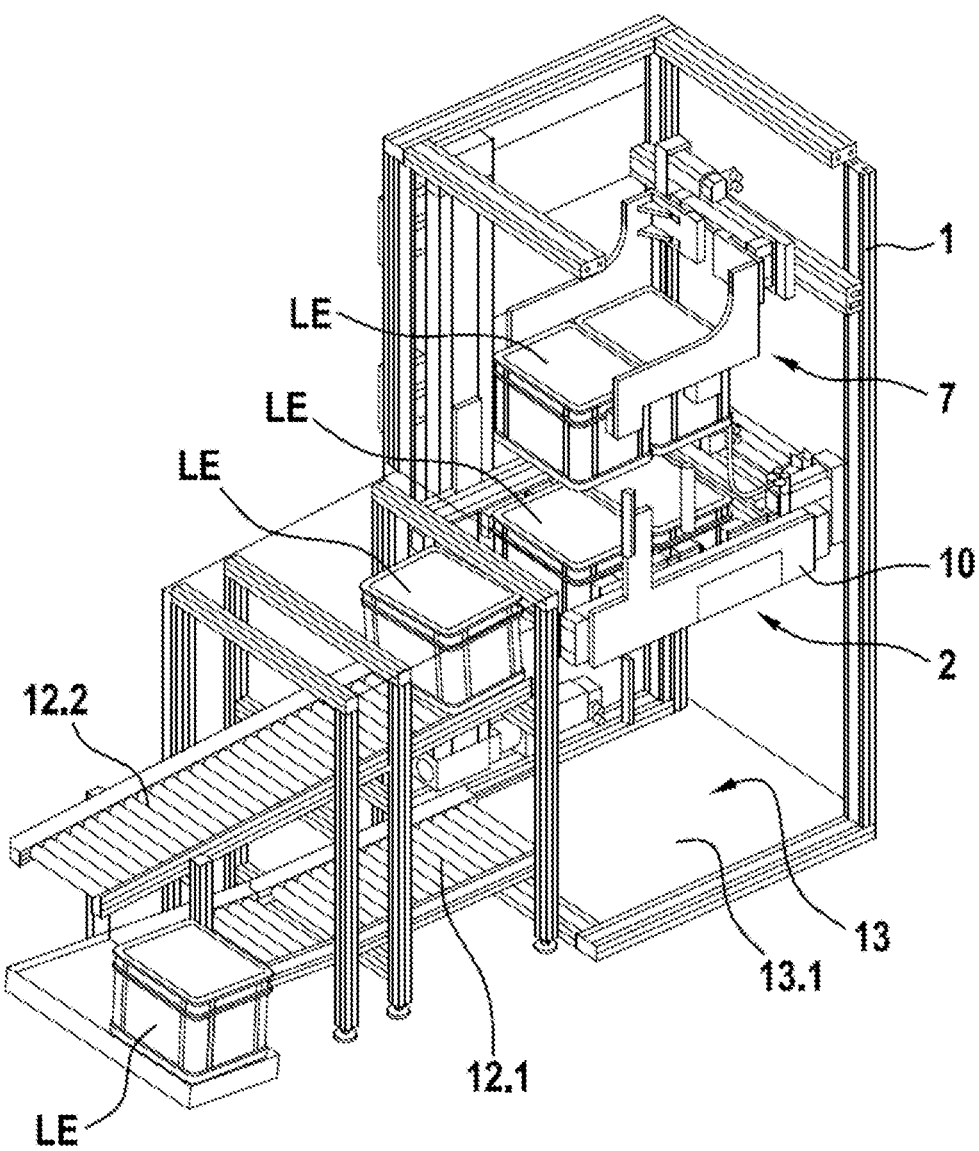
FIG. 4: shows the device according to FIG. 1 with an introducing conveyor device and discharge conveyor device and with storage units in four different positions.

FIG. 4 shows the device V according to FIG. 1 with a first conveyor device 12.1 and a second conveyor device 12.2 which are both constructed as a roller table. The first conveyor device 12.1 serves to introduce and the second conveyor device 12.2 serves to discharge at least one storage unit. Storage units LE are illustrated in four different positions, that is to say, outside the inner space 5 at an end of the first conveyor device 12.1 and at an end of the second conveyor device 12.2 and inside the inner space 5 inside the gripper device 3 and inside the storage arrangement 6.

Figure 5:
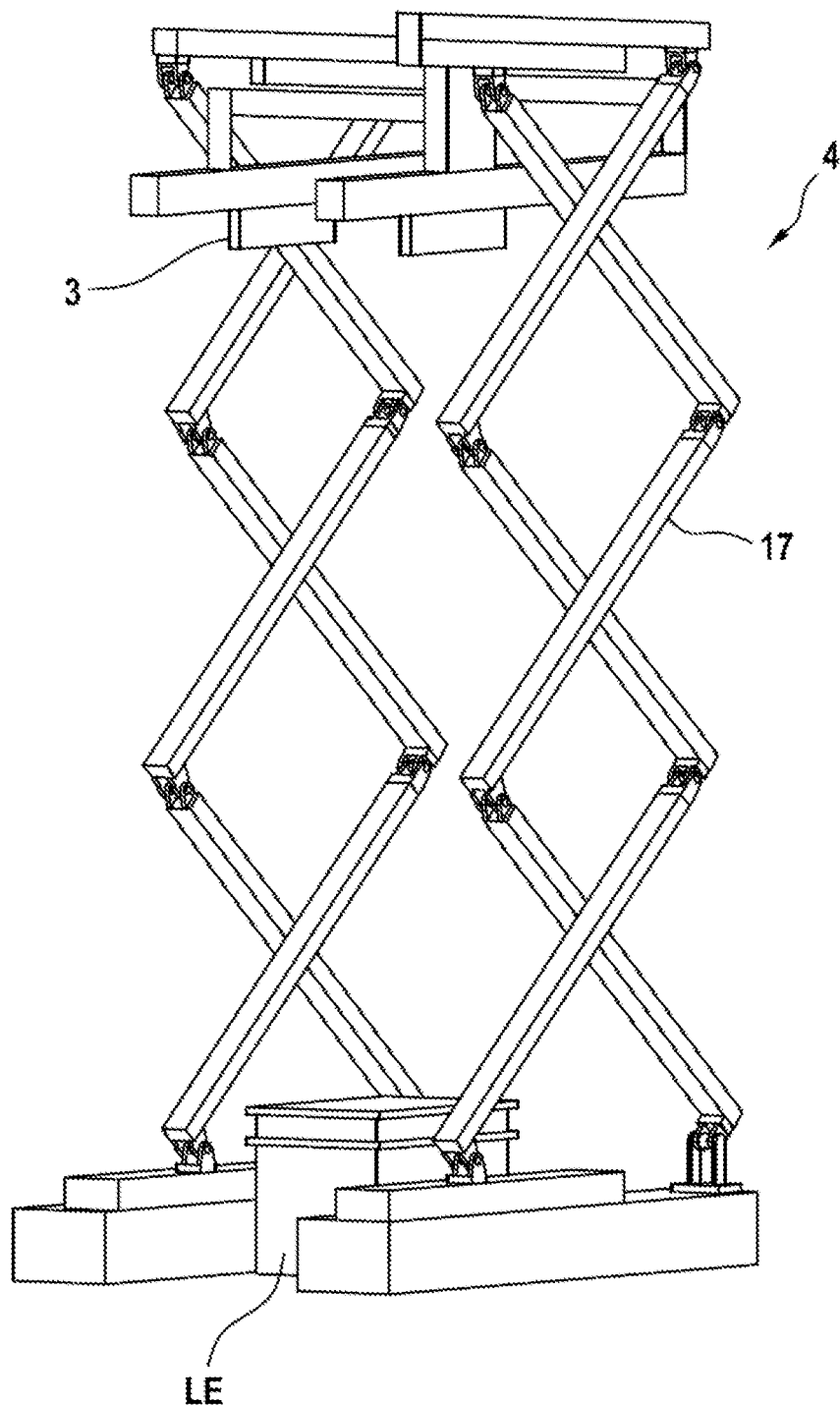
FIG. 5: shows a scissor type lifting and lowering device for at least one storage unit and with a gripper device.

According to FIG. 5, the height adjustment device 4 is in the form of a scissor type lifting and lowering device 17. The gripper device 3 is arranged in the upper end region. The scissor type lifting and lowering device 17 is arranged in the inner space of the support frame 1.

Figure 6:
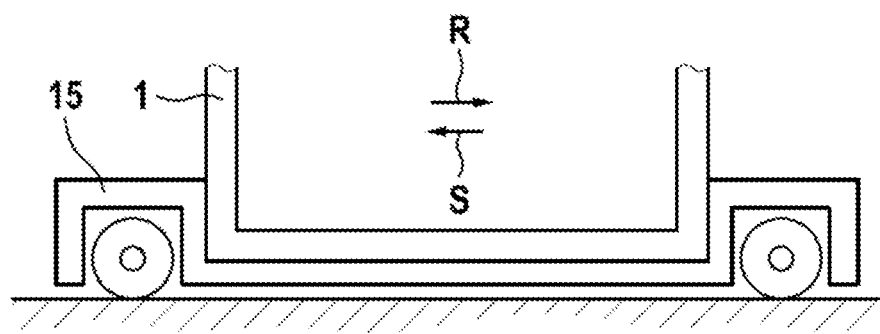
FIG. 6: is a side view of the support frame (illustrated in a broken-away manner) on a driverless transport vehicle.

FIG. 6 is a side view of the support frame 1—illustrated in a broken-away manner—on a loading face of a first transport device 15, for example, a driverless transport vehicle which can be moved in the direction of the arrows P and S.

Figure 7:
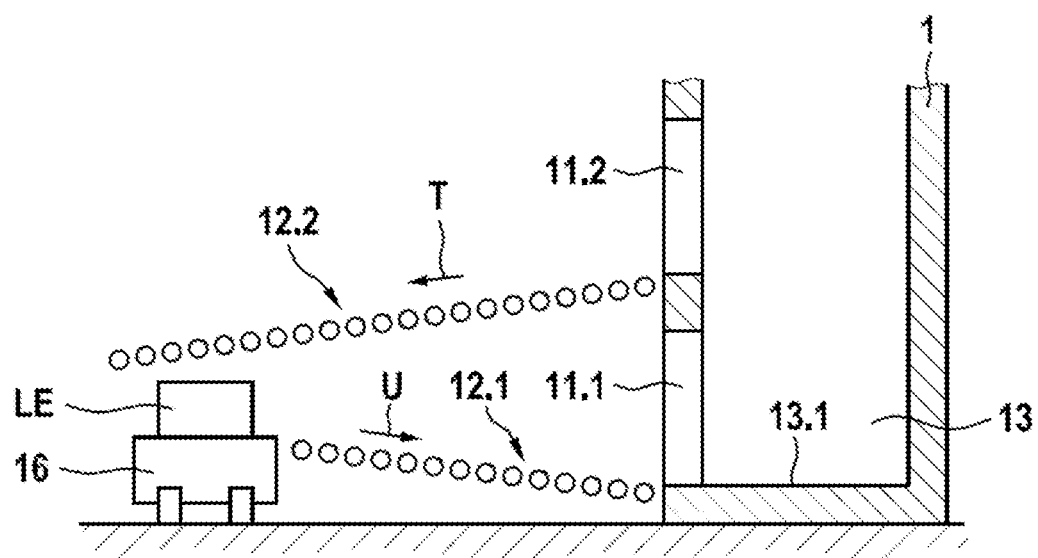
FIG. 7: is a side view of the support frame (illustrated in a broken-away manner) with openings in the support frame, to which an introducing conveyor device and discharge conveyor device is connected and a driverless transport vehicle which is associated with the introducing conveyor device.

FIG. 7 shows the support frame 1—illustrated in a broken-away manner—with a first opening 11.1 and a second opening 11.2 in a side wall of the support frame 1. The first conveyor device 12.1, for example, a roller table, which descends when viewed from a second transport device 16 in the direction of the support frame 1 is connected to the first opening 11.1. In this manner, a storage unit LE on the conveyor device 12.1 can be conveyed substantially by the effect of gravitational force in the direction U into the receiving space 13. The conveyed and received storage unit LE may comprise a plurality of storage units on a pallet which is not illustrated. The second conveyor device 12.2, for example, a roller table, which descends in the direction away from the support frame 1 is connected to the second opening 11.2. A storage unit LE on the conveyor device 12.2 can thereby be conveyed out of the inner space 5 substantially by gravitational force in the direction T and can be loaded on a driverless transport vehicle (not illustrated) or deposited at a processing location (work station).

With a view toward the configuration according to FIG. 7, an embodiment (not illustrated) without the first conveyor device 12.1 is possible. In this instance, a transport vehicle 16 or a pallet on a floor roller can be moved directly on the receiving face 13.1 of the receiving space 13. The receiving face 13.1 can also be configured as a roller table, on which a pallet with storage units can be conveyed. An embodiment (not illustrated) without a second conveyor device 12.2 is also possible. In this case, the gripper device 3 which is illustrated in FIG. 1 in the extended state can convey storage units directly from a transport vehicle 16 into the inner space 5 or onto a transport vehicle 16 from the inner space 5. In principle, the device V set out here can load and unload the storage units LE, for example, cases/KLTs on/from the floor roller/pallet. The first conveyor device 12.1 and the second conveyor device 12.2 can also be arranged at different sides of the support frame 1.

As a result of the device for automatic handling set out herein, cases/KLTs or similar transport boxes are unloaded from a pallet/floor roller onto a roller belt. KLTs/cases can be taken back again via a second roller belt and stacked back on the pallet/floor roller. A store above the working space serves to store the necessary products for the transport, storage or work station, at which the case handling robot is used. Furthermore, a flexible loading and unloading of the pallet/floor roller is enabled by the store. Cases/KLTs can automatically be brought by AGVs from the case handling robot via an automated communication or can be placed in the case handling robot.

LIST OF REFERENCE NUMERALS

1 Support frame
2 Lifting unit
3 Gripper device
3.1 First gripper element
3.2 Second gripper element
4 Height adjustment device
5 Inner space
6 Storage arrangement
7 Retention device
8 Retention frame
8.1 First retention element
8.2 Second retention element
9 Transverse carrier
10 Carrier unit
11.1 First opening
11.2 Second opening
12.1 First conveyor device
12.2 Second conveyor device
13 Receiving space
13.1 Receiving face
14 Clamping device
14.1 First clamping element
14.2 Second clamping element
15 First transport device
16 Second transport device
17 Scissor type lifting and lowering device
18 First motor
19 Second motor
20 Third motor
21 Fourth motor
22 Control device
23 Sensor arrangement
24.1 First attachment
24.2 Second attachment
24.3 Third attachment
24.4 Fourth attachment
25 Switch cabinet
V Device for handling storage units (LE)
LE Storage unit, storage units
A to U Movement directions

What is claimed is:

1. A device for automatically handling storage units, comprising:
    a support frame defining an inner space;
    a lifting unit and a gripper device arranged on the lifting unit, the lifting unit and the gripper device configured to grip, convey, and discharge a storage unit;
    at least one height adjustment device connected to the gripper device and configured to move the gripper device in the inner space of the support frame, the; and
    a storage arrangement configured to be charged solely by vertical movement of the storage unit from a location directly beneath the storage arrangement to a location at which the storage arrangement stores the storage unit, the storage arrangement arranged above the gripper device so that the same support frame is configured by the lifting unit to convey and to store, by the storage arrangement, the storage unit.

2. The device according to claim 1, wherein the storage arrangement is arranged in a fixed location on the support frame and has a movable retention device configured to receive and discharge at least one storage unit.

3. The device according to claim 1, wherein the support frame has at least one opening configured to allow the storage unit to pass therethrough, and wherein at least one conveyor device or at least one transport device for the storage unit is connected to the at least one opening.

4. The device according to claim 1, wherein the height adjustment device is a vertical guiding device.

5. The device according to claim 1, wherein the height adjustment device is a scissor type lifting and lowering device.

6. The device according to claim 1, wherein the gripper device is configured to releasably clamp the at least one storage unit along a first axis parallel to a horizontal plane, and wherein the gripper device is movable along a second axis transverse to the first axis and parallel to the horizontal plane.

7. The device according to claim 1, wherein the storage arrangement is integrated in the support frame.

8. The device according to claim 2, wherein the retention device comprises a clamping device.

9. The device according to claim 1, wherein a position detection device for the storage unit having at least one sensor arrangement is associated with the gripper device.

10. The device according to claim 1, wherein the gripper device is configured to be charged from the storage arrangement directly from above.

11. A method for carrying out storage actions with a storage unit by a device for automatically handling storage units, the device including at least one lifting unit with a gripper device, the method comprising:
    detecting the storage unit with the gripper device;
    gripping the detected storage unit with the gripper device;
    moving the gripper device with the gripped storage unit solely vertically from a location directly beneath a storage arrangement into a first location proximate the storage arrangement;
    retaining the storage unit in the storage arrangement without moving the storage unit horizontally from the first location; and
    releasing the at least one storage unit from the gripper device.

12. The method according to claim 11, further comprising:
    positioning at least one storage unit in an inner space of a support frame; and
    moving the gripper device in a vertical direction downward as far as the at least one storage unit.

13. The method according to claim 11, wherein the storage arrangement has a retention device that clamps the at least one storage unit laterally.

14. The method according to claim 11, wherein the gripper device removes at least one storage unit from the storage arrangement and discharges the at least one storage unit onto a conveyor device or a transport device.

15. The method according to claim 14, wherein the gripper device receives at least one storage unit from the conveyor device or the transport device.

16. The device according to claim 8, wherein the gripper device is configured to releasably clamp the storage unit along a first axis oriented parallel to a horizontal plane, and wherein the clamping device of the retention device is configured to releasably clamp the storage unit along a second axis oriented transverse to the first axis and parallel to the horizontal plane.

17. The device according to claim 16, wherein the first axis is orthogonal to the second axis.

* * * * *